US011688888B2

(12) United States Patent
Thurmeier et al.

(10) Patent No.: US 11,688,888 B2
(45) Date of Patent: Jun. 27, 2023

(54) WARNING SYSTEM AND WARNING METHOD FOR A MOTOR VEHICLE HAVING A HIGH-VOLTAGE BATTERY

(71) Applicant: AUDI AG, Ingolstadt (DE)

(72) Inventors: Markus Thurmeier, Adlkofen (DE); Bernd Mlekusch, Sankt veit/Glan (AT); Markus Sandfort, Neuburg a d Donau (DE); Julius Rausch, Heilbronn (DE); Christian Smykalla, Olching (DE); Michael Bürckert, Bad Mergentheim (DE)

(73) Assignee: AUDI AG, Ingolstadt (DE)

( * ) Notice: Subject to any disclaimer, the term of this patent is extended or adjusted under 35 U.S.C. 154(b) by 167 days.

(21) Appl. No.: 17/218,607

(22) Filed: Mar. 31, 2021

(65) Prior Publication Data

US 2021/0336298 A1  Oct. 28, 2021

(30) Foreign Application Priority Data

Apr. 28, 2020 (DE) ...................... 10 2020 111 569.5

(51) Int. Cl.
*H01M 10/44* (2006.01)
*H01M 10/42* (2006.01)
*H01M 10/48* (2006.01)

(52) U.S. Cl.
CPC ......... *H01M 10/425* (2013.01); *H01M 10/48* (2013.01); *H01M 2010/4271* (2013.01); *H01M 2010/4278* (2013.01)

(58) Field of Classification Search
CPC .......... H01M 10/425; H01M 10/4271; H01M 10/4278; H01M 10/48; H01M 10/482
See application file for complete search history.

(56) References Cited

FOREIGN PATENT DOCUMENTS

| DE | 103 61 647 A1 | 8/2005 | |
| DE | 10 2004 031 575 A1 | 2/2006 | |
| DE | 10 2010 050 826 A1 | 5/2012 | |
| DE | 10 2012 110 733 A1 | 5/2014 | |
| DE | 10 2017 101 448 A1 | 8/2017 | |
| DE | 10 2018 126 572 A1 | 4/2020 | |
| EP | 2 369 656 A1 | 9/2011 | |
| EP | 2369656 | * 9/2011 | .............. H01M 2/10 |

OTHER PUBLICATIONS

Examination Report dated Mar. 9, 2021 in corresponding German application No. 10 2020 111 569.5; 12 pages including Machine-generated English-language translation.

* cited by examiner

*Primary Examiner* — Raymond Alejandro
(74) *Attorney, Agent, or Firm* — Maier & Maier, PLLC

(57) ABSTRACT

A warning system and a warning method for a motor vehicle having a high-voltage battery. The warning system includes a battery housing having the high-voltage battery, an underride protection device, a spatially closed cavity, at least one pressure sensor, and an evaluation device. The spatially closed cavity is arranged in a vertical direction of the warning system above the underride protection device and below the battery housing and is designed to change a volume of the cavity upon a deformation of the underride protection device under the action of a predetermined external force on the underride protection device. The at least one pressure sensor is designed to detect a pressure change value that describes a change in pressure in the pressure in the cavity.

12 Claims, 4 Drawing Sheets

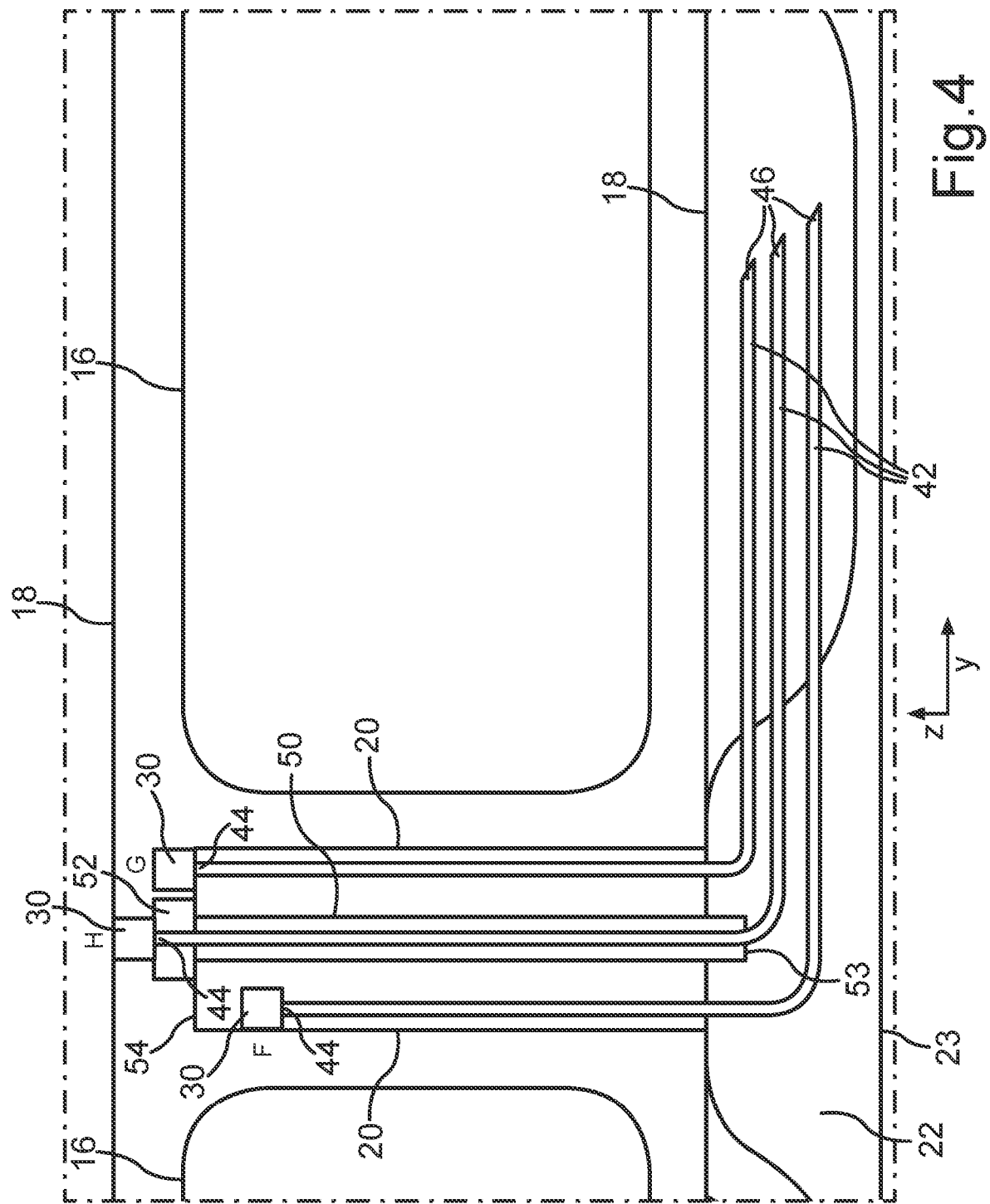

WARNING SYSTEM AND WARNING METHOD FOR A MOTOR VEHICLE HAVING A HIGH-VOLTAGE BATTERY

FIELD

The disclosure relates to a warning system for a motor vehicle having a high-voltage battery and a motor vehicle having a high-voltage battery and such a warning system. The disclosure also relates to a warning method for such a warning system.

BACKGROUND

In a motor vehicle having a high-voltage battery, this battery is often arranged above an underride protection device in the motor vehicle. In conjunction with a rear-end collision of the motor vehicle and/or driving over an elevation, such as a bollard or a raised curb, damage to the underride protection device and possibly even damage to the high-voltage battery arranged above the underride protection device can occur. However, it has so far been difficult to predict how and to what extent the actual high-voltage battery or its components have actually been damaged.

DE 10 2010 050 826 A1 discloses an arrangement of at least one battery in an electrically driven motor vehicle, which is arranged between longitudinally extending lateral sills on the underbody of a vehicle body of the motor vehicle. To protect the battery, lateral deformation elements are arranged which have airbag sensors that can detect a lateral accident of the motor vehicle with the aid of acceleration sensors.

DE 10 2017 101 448 A1 discloses a frame arrangement for a vehicle in which door sills are provided laterally to a battery compartment of a battery, which have a pressure insert in order to reduce a probability of penetration into a passenger compartment and/or into the battery compartment. A pressure sensor, which can detect a force acting on the pressure insert, can be integrated into the pressure insert.

EP 2 369 656 A1 discloses an electric vehicle having a high-voltage battery in a battery housing, wherein an impact sensor in the form of an acceleration sensor is positioned above the housing. A shock absorber of the electric vehicle is controlled based on the measurement data from the impact sensor.

SUMMARY

It is the object of the disclosure to provide a solution by means of which a warning can be given at an early stage before possible damage to a high-voltage battery of a motor vehicle.

The disclosure is based on the finding that to implement an early warning system for a motor vehicle having a high-voltage battery, sensors should be positioned in the surroundings of the high-voltage battery. This is because this makes it possible, for example, to detect damage within the high-voltage battery due to the action of an external force on the high-voltage battery already while the high-voltage battery is in operation and, for example, to provide a warning about the detected damage.

The warning system according to the disclosure for a motor vehicle having a high-voltage battery has a battery housing comprising the high-voltage battery, an underride protection device, a spatially closed cavity, at least one pressure sensor, and an evaluation device. The high-voltage battery can comprise multiple high-voltage battery modules which are arranged within the battery housing. The underride protection device is preferably designed as an underride protector, i.e., as a component of the motor vehicle that is designed to prevent a smaller vehicle than the motor vehicle, such as a smaller motor vehicle or a bicycle, from driving below a body, at least one wheel, and/or a chassis of the motor vehicle from the front or rear in the event of a road traffic accident. The underride protection device is produced, for example, from plastic, for example from carbon fibers, and/or is designed in the form of a two to three millimeter thick metal plate, for example made of aluminum. The pressure sensor can be designed, for example, as a piezoresistive, piezoelectric, capacitive, and/or inductive pressure sensor and/or as a pressure sensor having a Hall element. The pressure sensor can be a pressure change sensor, as is often installed in a vehicle door of a motor vehicle for triggering an airbag of the vehicle door. The reason for this is that such pressure change sensors can detect small pressure changes particularly quickly and reliably.

The spatially closed cavity is arranged in a vertical direction of the warning system above the underride protection device and below the battery housing. The cavity is thus positioned between the underride protection device and the battery housing and has a cavity wall which delimits it from both the underride protection device and also the battery housing. The cavity is designed to change a volume of the cavity if the underride protection device is deformed under the action of a predetermined external force on the underride protection device. The cavity is thus designed to be deformed when the underride protection device is deformed due to the action of the predetermined external force on the underride protection device. As a result, the cavity is designed to experience a pressure change in a pressure in the cavity due to the change of the volume. If there is a volume change of a predetermined volume of the cavity due to the action of the external force on the underride protection device of the warning system, the pressure in the cavity, which is arranged between the underride protection device and the battery housing, is also changed and the pressure change occurs.

The deformation of the underride protection device under the action of the predetermined external force occurs, for example, upon driving over an elevation, such as a bollard and/or a raised curb. If, for example, a motor vehicle with the warning system drives over this elevation at an elevated speed, the external force can act on an outer wall of the underride protection device, which for example corresponds to an underbody wall of the motor vehicle, so that the underride protection device is deformed. Due to this deformation, the cavity wall can also be deformed, so that a spatial delimitation of the cavity deforms. The outer wall of the underride protection device is pressed upwards, for example, in the vertical direction of the warning system and thus presses into the spatially closed cavity, so that its volume is reduced. This causes the pressure change in the pressure in the cavity, specifically for example an increase in the pressure in the cavity, wherein the pressure change, which typically takes place over a short period of time, results in the creation of a pressure wave which can propagate within the cavity.

The at least one pressure sensor is designed to detect a pressure change value, which describes the pressure change of the pressure in the cavity due to the change in the volume of the cavity, and to provide it to the evaluation device. The at least one pressure sensor is therefore positioned within the warning system in such a way that the pressure wave resulting due to the deformation of the underride protection device and the cavity wall and the associated volume change of the volume of the cavity is detected by the pressure sensor. The pressure change describes the change in pressure from the pressure prevailing in the cavity before the force action on the underride protection device and the cavity to the pressure within the closed cavity after the deformation of the underride protection device and thus after the volume change of the volume of the cavity. The pressure change in the pressure in the cavity in the form of the exemplary pressure increase due to driving over the elevation is thus detected by the pressure sensor as a pressure change value and provided for further evaluation by means of the evaluation device.

The evaluation device of the warning system is designed to provide a warning signal if the detected pressure change value is greater than a predetermined limit change value. A limit value for the change in pressure is therefore specified in the evaluation device, so that as soon as this specified limit value is exceeded, this is viewed as triggering the warning system and the warning signal is provided. The warning signal can comprise, for example, the information that the motor vehicle in which the warning system is installed should visit a workshop, since the observed pressure change suggests that the underride protection device and the cavity wall were severely deformed, so that it should be checked whether there has also been damage to the battery housing, the high-voltage battery, and/or at least one further component of the high-voltage battery, such as a cooling system of the high-voltage battery.

The warning system according to the disclosure therefore provides a measuring arrangement for detecting a crash of a motor vehicle having the warning system according to the disclosure in that by detecting a pressure difference in the cavity between the underride protection device and the battery housing, it is established whether or not a user of a motor vehicle should be warned due to an observed deformation of the underride protection device. By positioning the pressure sensor within the warning system and thus, for example, in the spatial vicinity to the involved and deformed components, such as the underride protection device, the cavity wall, and/or possibly the battery housing, it can be concluded particularly quickly and even while the motor vehicle is in operation whether or not a warning signal regarding the deformation experienced by the underride protection device should be provided and output. In this way a user of the motor vehicle having the warning system can be warned reliably and early of possible detected damage to the high-voltage battery of the motor vehicle by means of the warning system.

The disclosure also comprises embodiments which result in additional advantages.

In one advantageous embodiment, it is provided that the at least one pressure sensor is arranged in the cavity. The at least one pressure sensor can therefore be positioned directly in the region in which the pressure change is expected. As a result, it can be concluded promptly and reliably from the detected pressure change value that this is actually to be attributed to the pressure change in the cavity due to the deformation of the cavity wall and the accompanying volume change of the cavity caused by the deformation of the underride protection device. This makes the warning system particularly fast and reliable in providing the warning signal.

In one particularly advantageous embodiment of the warning system, it is provided that the warning system comprises at least one hose having a first hose end and a second hose end. In other words, the warning system comprises a flexible tube made of, for example, rubber or plastic, through which liquids or gases can be conducted. The hose is preferably a hollow body having, for example, a round cross section, which has a predetermined flexibility. The first hose end of the hose is coupled to the at least one pressure sensor. In contrast, the second end of the hose is positioned open in the cavity. The hose is thus at least indirectly connected to another component of the warning system only at the first hose end, namely with the pressure sensor, whereas the hollow body of the hose is open at the second hose end. With this open end, the hose protrudes into the cavity, so that an interior of the hose is in an exchange with the cavity, so that both a gas in the cavity and a liquid in the cavity can reach the pressure sensor through the hose.

If, in case of the underride protection device deforming, the pressure change of the pressure in the cavity is observed in the form of a pressure wave that propagates within the cavity, this pressure wave is also propagated through the open second hose end inside the hose, so that the pressure wave can be detected at the first hose end by the pressure sensor. The tube thus serves to relay the observed pressure change from the second hose end positioned in the cavity to a pressure sensor positioned outside the cavity, for example. This makes it possible that the pressure sensor does not have to be arranged in the cavity itself, but rather it can be integrated into the underride protection device, for example. The pressure sensor, however, is in exchange with the gas in the cavity with the aid of the hose, which is positioned at least with the second hose end open in the cavity, and is thus ultimately is connected to the cavity.

In this way, it is possible to avoid the pressure sensor being arranged, for example, in the cavity itself. Since the cavity is part of the so-called watt region of the motor vehicle, that is, if necessary, it can be at least partially filled or even filled completely with water or another liquid if the motor vehicle drives through a deep puddle or another body of water, it can be advantageous not to arrange the pressure sensor directly in the cavity. With the aid of the hose it is therefore possible that the at least one pressure sensor is always arranged in a dry region of the warning system and thus the warning system as a whole remains functional for a particularly long time and even if liquid and moisture penetrate into the underride protection device and the cavity adjoining it. The warning system is therefore designed to be particularly robust.

In a further embodiment, it is provided that the at least one pressure sensor is arranged in at least one of the following positions in the warning system: in a vertical direction of the warning system above the battery housing; in the underride protection device; inside the battery housing in the vertical direction of the warning system above and/or in a transverse direction of the warning system laterally to the high-voltage battery; inside the battery housing within and/or in the vertical direction of the warning system above at least one separating element of the battery housing, wherein the at least one separating element spatially separates at least two high-voltage battery modules of the high-voltage battery from one another; above a screw head of at least one connecting screw of the warning system, wherein the battery housing is coupled to the underride protection device by means of the at least one connecting screw, wherein the at least one connecting screw is coupled to an upper side of the at least one separating element of the battery housing by means of the screw head.

Numerous different positionings of the at least one pressure sensor inside and outside the battery housing and the underride protection device are thus possible. Depending on the positioning of the at least one pressure sensor, the hose, which is positioned open in the cavity at the second hose end and is coupled to the at least one pressure sensor at the first hose end, is to be guided in such a way that it extends from the respective positioned pressure sensor into the cavity. The hose length is therefore to be dimensioned accordingly. In addition, it is to be ensured that the hose is not kinked at any point, so that the pressure change in the cavity can still be detected by the pressure sensor with the aid of the hose. Numerous different positions of the at least one pressure sensor are thus possible, so that the warning system can be designed in a particularly versatile manner, wherein in each case the position of the at least one pressure sensor can be selected, by which optimum space utilization and integration of the pressure sensor in the battery housing or the underride protection device can be achieved depending on the selected battery housing and the selected underride protection device. The warning system can thus be integrated into battery housings of various designs having underride protection devices arranged bearing thereon.

In one additional embodiment, it is provided that the warning system comprises a display device. The display device is designed to display the provided warning signal as a predetermined warning message. The display device can be designed, for example, as a touch-sensitive display screen and/or as a head-up display of the motor vehicle. The warning message can, for example, be displayed in text form on this display device and comprise, for example, the information that the motor vehicle should visit a workshop as soon as possible because the underride protection device was deformed, due to which the high-voltage battery of the motor vehicle was damaged. Alternatively or additionally thereto, the display device can comprise a loudspeaker which is designed to output an auditory warning message, that is to say a warning tone and/or a predetermined voice output. This enables a user of the motor vehicle in which the warning system is provided to be informed of the potential damage to the high-voltage battery and/or of at least one component of the high-voltage battery, so that he can, for example, visit a workshop promptly.

The warning method according to the disclosure for providing a warning signal for a motor vehicle having a high-voltage battery is based on the warning system described above. The warning system thus comprises a battery housing, comprising the high-voltage battery, an underride protection device, a spatially closed cavity, at least one pressure sensor, and an evaluation device. The spatially closed cavity is arranged in a vertical direction of the warning system above the underride protection device below the battery housing, wherein a volume of the cavity is changed when the underride protection device is deformed under the action of a predetermined external force on the underride protection device. Due to this change in volume, a pressure in the cavity changes. The warning method according to the disclosure comprises the following steps: detecting a pressure change value, which describes a pressure change in a pressure in the cavity due to the change of the volume of the cavity, by means of the at least one pressure sensor of the warning system, providing the pressure change value for the evaluation device of the warning system, checking by means of the evaluation device whether the provided pressure change value is greater than a predetermined limit change value and, if the provided pressure change value is greater than the predetermined limit change value, providing the warning signal.

The warning signal provided here can comprise, for example, that the driver of the motor vehicle is to drive the motor vehicle to a workshop. Alternatively or additionally thereto, the warning signal can only be stored internally in the warning system, that is to say in the evaluation device, and can be provided for later analysis, for example. In addition, the warning signal can be provided as a warning notice on a display device of the motor vehicle, so that it is displayed by means of the display device that, for example, a current driving style is not optimal for a state of the high-voltage battery, so that the driver can adapt future driving behavior, for example based on this notice, so that visiting a workshop due to a deformation of the underride protection device and of a cavity wall of the cavity can be avoided in the near future.

The disclosure also includes refinements of the warning method according to the disclosure, which have features as already described in the context of the refinements of the warning system according to the disclosure. For this reason, the corresponding refinements of the warning method according to the disclosure are not described again here.

In one advantageous embodiment of the warning method according to the disclosure, it is checked whether the provided pressure change value is greater than a predetermined alarm limit change value. The alarm limit change value is greater than the limit change value. If the provided pressure change value is greater than the predetermined alarm limit change value, an alarm signal is provided. If, for example, after the warning signal has been provided, it is only stored that the limit change value has been exceeded and/or a notice is displayed on the display device according to which, for example, a driving style of the user of the motor vehicle could lead to damage to the high-voltage battery in the long term, the notice is thereupon output as an alarm signal, that is to say upon a still greater pressure change in the cavity, that the driver of the motor vehicle should drive to a workshop. Alternatively thereto, if a warning signal is already output that the driver should go to a workshop to have the high-voltage battery checked, the notice that the driver should stop the motor vehicle as quickly as possible and leave the motor vehicle, because severe damage of the high-voltage battery has occurred, can be output as the alarm signal. A two-stage warning method can therefore be provided, since the pressure sensor is designed to differentiate between two different pressure levels, so that differentiated and situation-adapted measures with the aid of the warning signal and/or the alarm signal for a driver of the motor vehicle, for example, can be taken with regard to the further procedure after the deformation of the underride protection device. The warning method is therefore suitable for the detailed and specifically situation-dependent assessment of a state to be expected of the high-voltage battery of the motor vehicle having the warning system. Alternatively or additionally to the two pressure levels described, further limit values for the pressure change can be predetermined so that further warning and/or alarm signals can be provided.

The motor vehicle according to the disclosure has a warning system as described above. The motor vehicle having this warning system is therefore designed to carry out the warning method described above. The disclosure also includes refinements of the motor vehicle according to the disclosure, which have characteristics as already described in the context of the refinements of the warning system according to the disclosure and the warning method according to the disclosure. For this reason, the corresponding refinements of the motor vehicle according to the disclosure are not described again here.

The motor vehicle according to the disclosure is preferably designed as an automobile, in particular as a passenger car or truck, or as a passenger bus or motorcycle.

The disclosure also includes the evaluation device for the warning system. The evaluation device has a processor device which is configured to carry out an embodiment of the warning method according to the disclosure. For this purpose, the processor device can have at least one microprocessor and/or at least one microcontroller and/or at least one FPGA (Field Programmable Gate Array) and/or at least one DSP (Digital Signal Processor). Furthermore, the processor device can have program code which is configured to carry out the embodiment of the warning method according to the disclosure when it is executed by the processor device. The program code can be stored in a data memory of the processor device.

The disclosure also comprises the combinations of the features of the described embodiments.

BRIEF DESCRIPTION OF THE FIGURES

Exemplary embodiments of the disclosure are described hereinafter. In the figures:

FIG. 4 shows a schematic illustration of a warning system for a motor vehicle, having multiple possible positionings of a pressure sensor in the region of a separating element as well as a connecting screw of a battery housing.

DETAILED DESCRIPTION

Figure 1:
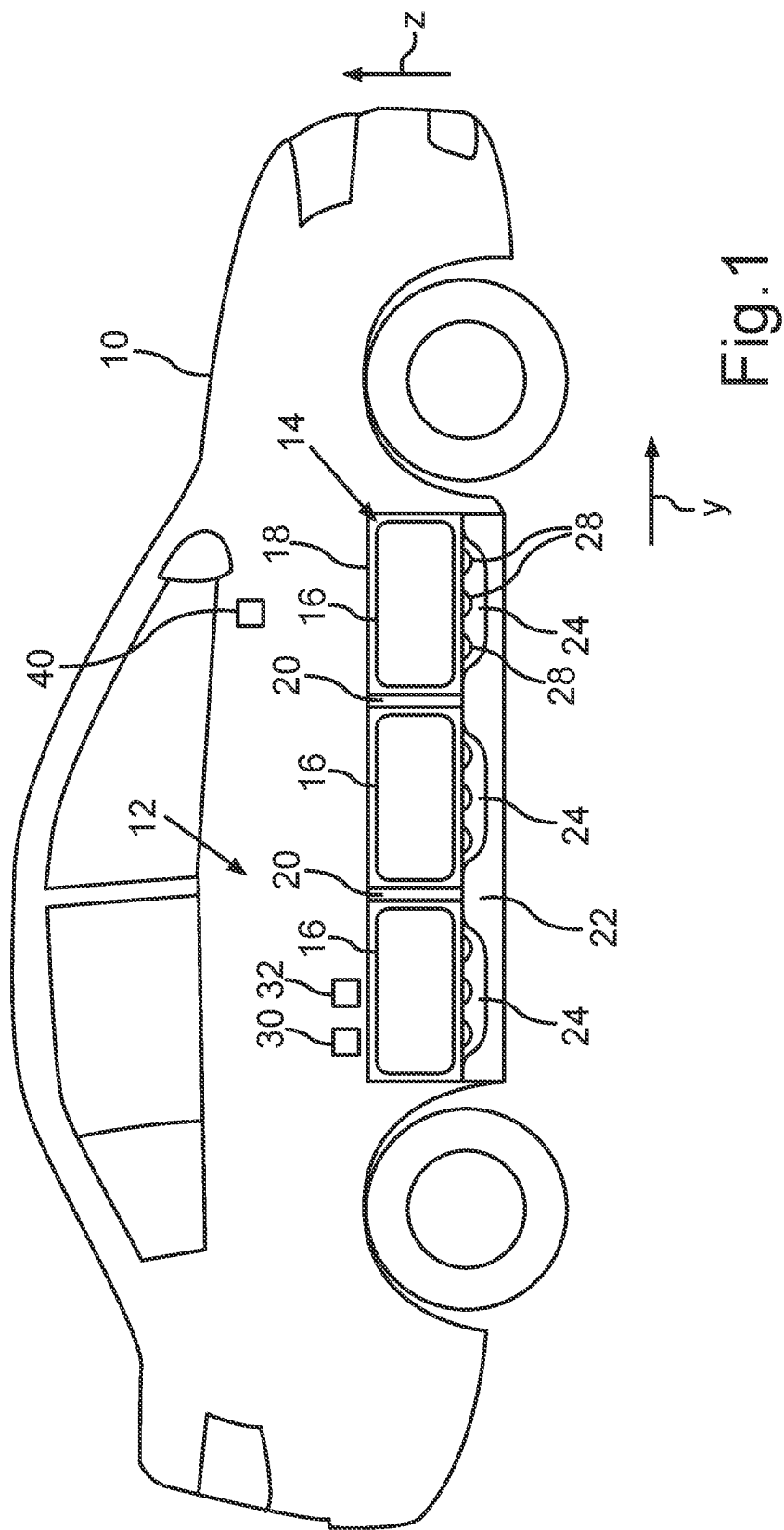
FIG. 1 shows a schematic illustration of a motor vehicle having a warning system.

The exemplary embodiments explained hereinafter are preferred embodiments of the disclosure. In the exemplary embodiments, the described components of the embodiments each represent individual features of the disclosure to be considered independently of one another, which each also refine the disclosure independently of one another. Therefore, the disclosure is also intended to include combinations of the features of the embodiments other than those shown. Furthermore, the described embodiments can also be supplemented by further features of the disclosure that have already been described.

In the figures, the same reference numerals designate elements that have the same function.

In FIG. 1, a motor vehicle 10 is sketched that comprises a warning system 12. The warning system 12 comprises a high-voltage battery 14 of the motor vehicle 10, which has multiple high-voltage battery modules 16. The high-voltage battery 14 is enclosed by a battery housing 18. Between the individual high-voltage battery modules 16 of the high-voltage battery 14, respective separating walls 20 are arranged within the battery housing 18.

The warning system 12 also includes an underride protection device 22 which is produced from a plastic. This plastic is designed, for example, in the form of a plastic foam. A spatially closed cavity 24 is arranged between the underride protection device 22 and the battery housing 18. In a vertical direction of the warning system, which corresponds to the z-direction shown here and thus a vehicle vertical direction of the motor vehicle 10, the spatially closed cavity 24 is arranged above the underride protection device 22 and below the battery housing 18. In addition, individual components of a cooling system 28 of the high-voltage battery 14, such as cooling water lines, protrude into the cavity 24. These components of the cooling system 28 are shown here only for the high-voltage battery module 16 which is front in a vehicle longitudinal direction, wherein the vehicle longitudinal direction corresponds to a y-direction shown in FIG. 1.

The warning system 12 also comprises a pressure sensor 30, an evaluation device 32, and a display device 40. The display device 40 is arranged, for example, as a display screen and/or loudspeaker in an interior of the motor vehicle 10. The warning system 12 can comprise multiple pressure sensors 30 overall (not shown in FIG. 1).

Figure 2:
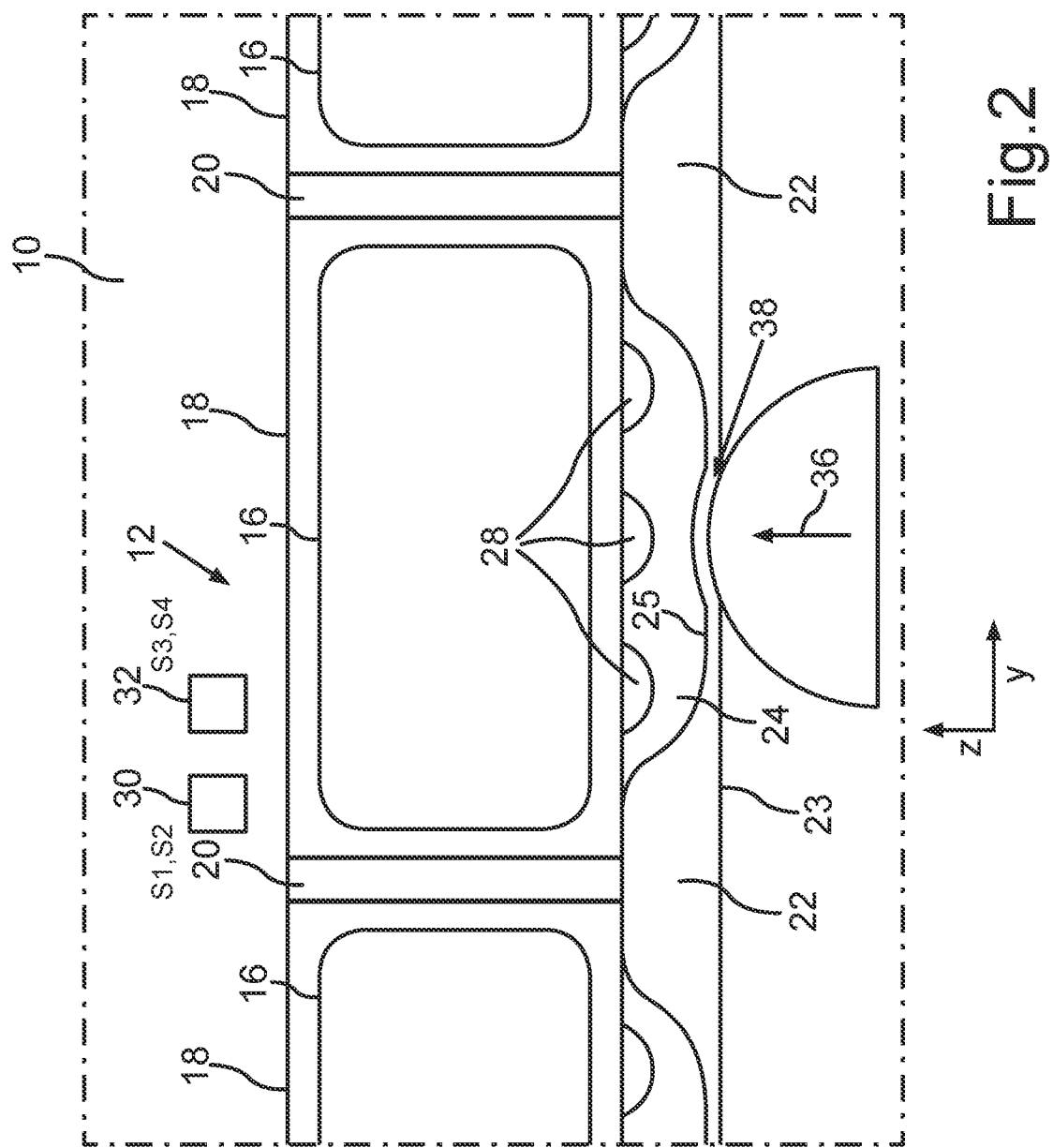
FIG. 2 shows a schematic representation of a deformation of an underride protection device as well as a cavity of a warning system of a motor vehicle upon driving over an elevation.

In FIG. 2, the warning system 12 arranged in the motor vehicle 10 is sketched again in a detail, wherein the motor vehicle 10 here drives over an elevation 34, such as a bollard or a raised curb. Because the elevation 34 is driven over, an external force 36 acts on the underride protection device 22, whereby the underride protection device 22 is deformed. A deformation 38 of the underride protection device 22 is thus observed. A direction of the external force 36 is drawn here with the aid of an arrow, which here is arranged parallel to the z-direction, that is to say to the vertical direction of the warning system 12.

The cavity 24 is designed to change a volume of the cavity 24 upon the deformation 38 of the underride protection device 22. Not only is an outer wall 23 of the underride protection device 22 deformed, but also a cavity wall 25 of the cavity 24. This causes a volume change of the current volume of the cavity 24 and thus a pressure change of a pressure in the cavity 24. The cavity 24 is therefore designed ultimately to experience a pressure change of the pressure in the cavity 24 during the deformation 38 of the underride protection device 22 due to the action of the external force 36.

The at least one pressure sensor 30 is designed to detect a pressure change value, which describes the pressure change of the pressure in the cavity 24 due to the change in the volume of the cavity 24, and to provide it to the evaluation device 32. The pressure change value is therefore detected in a first method step S1 by means of the at least one pressure sensor 30 and in a step S2 this pressure change value is provided to the evaluation device 32.

The evaluation device 32 is designed to provide a warning signal if the detected pressure change value is greater than a predetermined limit change value. In a method step S3 there is therefore a check by means of the evaluation device 32 as to whether the provided pressure change value is greater than the predetermined limit change value. The warning signal is then provided in a step S4, specifically if the provided pressure change value is greater than the predetermined limit change value.

It can also be checked whether the provided pressure change value is greater than a predetermined alarm limit change value, wherein the alarm limit change value is greater than the limit change value. If the provided pressure change value is greater than the predetermined alarm limit change value, an alarm signal is provided. If only an increased pressure change is stored as a warning signal within the evaluation device 32 as an observed event, without there being a notice output by means of the display device 40, it can be output by means of the display device 40 as an alarm signal that the driver should visit a workshop as soon as possible. However, if the driver is already requested as a warning signal to drive to a workshop, it can be displayed as an alarm signal by means of the display device 40 that the driver should stop as quickly as possible and leave the vehicle, since the high-voltage battery has been severely damaged.

This is based on the fact that the display device 40 of the warning system 12 is designed to display the provided warning signal as a predetermined warning message. Similarly, the alarm signal provided can be displayed as a predetermined alarm message. This display can take place in the form of an optical warning signal or alarm signal, that is to say with the aid of an illuminated display and/or text display. Alternatively or additionally thereto, the warning message and/or the alarm message can be output as an audio signal, for example as a warning tone and/or spoken warning message and/or alarm message.

Figure 3:
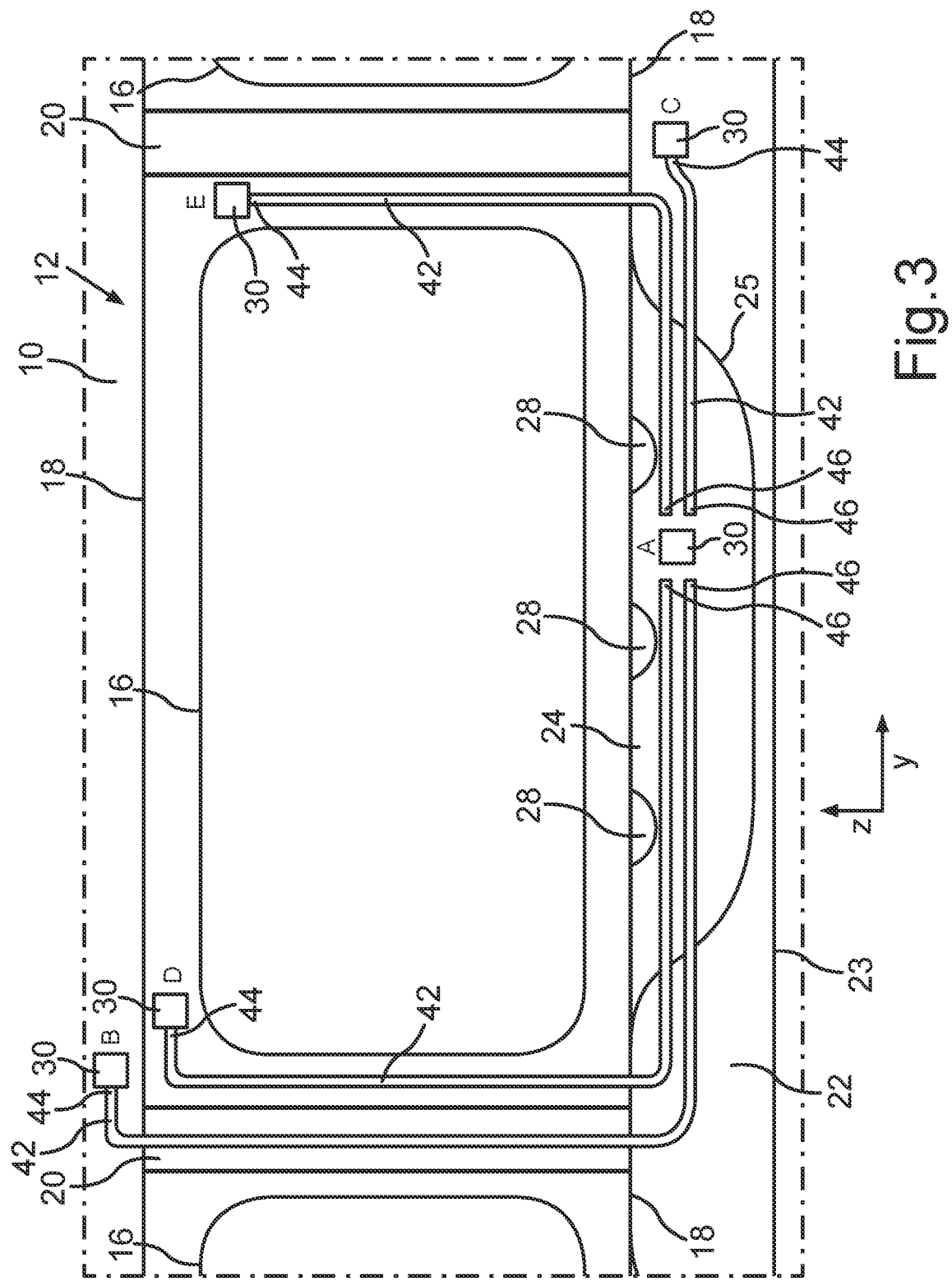
FIG. 3 shows a schematic illustration of a warning system for a motor vehicle having different positionings of a pressure sensor.

FIG. 3 shows various arrangements of the at least one pressure sensor 30 within the warning system 12. Here, the various positions of the pressure sensor 30 are distinguished from one another with the aid of letters. In a position A, the pressure sensor 30 is arranged directly in the cavity 24 by being positioned on the cavity wall 25. The further positions of the pressure sensor 30 sketched in FIG. 3, namely positions B, C, D, and E, each have a pressure sensor 30 having a hose 42. The hose 42 is coupled to the respective pressure sensor 30 at a first hose end 44. The hose 32 also has a second hose end 46 which is positioned open in the cavity 24 in each case. With the aid of the hose 32, the respective pressure sensor 30 is thus in an exchange with the cavity 24 regardless of its exact position within the warning system 12, so that the pressure change observed there can be detected by the respective pressure sensor 30.

In position B, the pressure sensor 30 is positioned above the battery housing 18 in the z-direction, that is to say in the vertical direction of the warning system 12. For this purpose, the hose 42 is guided through the separating element 20 and through the underride protection device 22 to the cavity 24.

In position C, the pressure sensor 30 is positioned in the underride protection device 22, wherein the hose 42 leads through the underride protection device 22 into the cavity 24. The underride protection device 22 is produced from the plastic foam through which corresponding holes for the hose 42 have been drilled.

In position D, the pressure sensor 33 is arranged inside the battery housing 18 in the z-direction above the high-voltage battery 14, that is to say above the high-voltage battery module 16. The hose 42 leads here through an intermediate space between the separating element 20 and the battery module 16 and is guided on the lower wall of the battery housing 18 in the z-direction into the underride protection device 22 and from there into the cavity 24.

In position E, the pressure sensor 30 is arranged within the battery housing 18 in a transverse direction of the warning system 12, that is to say in the y-direction, laterally to the high-voltage battery 14, that is to say laterally to the high-voltage battery module 16. The hose 42 is guided here through the intermediate space between the high-voltage battery module 16 and the separating element 20, wherein a passage for the hose 42 from the battery housing 18 to the cavity 24 is provided here.

In FIG. 4, three further positions for the pressure sensor 30 are sketched, namely the positions F, G, and H. Here, the separating element 20 is designed such that a connecting screw 50 is guided through it, which extends from a screw head 52 to a screw tip 53, wherein the screw head 52 is coupled to the separating element 20 on an upper side 54 of the separating element 20. The connecting screw 50 is used here to couple the battery housing 18 to the underride protection device 22. The three pressure sensors 30 shown here also each have a hose 42, wherein the second hose end 46 ends open in the cavity 24.

In position F, the pressure sensor 30 is positioned within the battery housing 18 inside the separating element 20. The hose 42 extends here through an inner cavity of the separating element 20 and through the underride protection device 22 to the cavity 24.

In position G, the pressure sensor 30 is positioned above the separating element 20, so that the hose 42 is guided through an opening in the upper side 54 of the separating element 20, through the inner cavity of the separating element 20, and through the underride protection device 22 to the cavity 24.

In position H, the pressure sensor 30 is arranged above the screw head 52 of the connecting screw 50 within the battery housing 18. The hose 42 extends here through the screw head 52 and through an opening within the connecting screw 50, wherein the hose 42 leaves the connecting screw 50 again in the region of the screw tip 53 and is guided through the underride protection device 22 into the cavity 24.

Overall, the examples show how contactless damage detection on a high-voltage battery 14 of an electrically operable motor vehicle 10 or a hybrid vehicle as the motor vehicle 10 can be provided. One or more pressure change sensors, that is, one or more pressure sensors 30, can be provided here, which detect a pressure change in the cavity 24 between the underride protection device 22 and the battery housing 18 upon a deformation 38 of the underride protection device 22. This deformation 38 can be a consequence of an accident, that is to say a crash, of the motor vehicle 10. Such pressure change sensors are normally installed in doors of the motor vehicle 10 for airbag triggering of a vehicle door airbag, since they detect this very well. In the event of a crash in the underride protection device 22, the underride protection device 22 is compressed and a pressure wave is triggered. This would be sufficient to give a deflection in the case of the pressure sensor 30. A signal can then be sent to motor vehicle 10 that comprises that the motor vehicle 10 should be brought to a workshop. This signal is therefore the warning signal or the alarm signal. A deflection threshold would exist in case of a crash.

The pressure sensor 30 is not necessarily to be seated in the cavity 24 of the underride protection device 22, since this is located in the watt region and can fill up with water, for example. It is therefore possible to place the pressure sensor 30 above the battery housing 18, where it is always in the dry space. For example, via the through screw connection, that is, with the aid of the connecting screw 50 or similar connection points in the battery housing 18, respective hoses 42 can be placed that are in contact with the pressure sensor 30, that is, are connected to the pressure sensor 30. The pressure sensor 30 can then be arranged above the connecting screw 50, for example.

The warning system 12 thus represents a measuring arrangement for measuring a pressure difference in the cavity 24 between the underride protection device 22 and the battery housing 18. The pressure sensor is seated here above the high-voltage battery 14, below the battery housing 18, above the high-voltage battery module 16, and/or above the connecting screw 50.

When the underride protection device 22 is compressed under the pressure wave, this is read out with the aid of the pressure sensor 30. The pressure sensor 30 can distinguish here between two different pressure levels, specifically on the basis of the limit change value and the alarm limit change value. This allows a distinction between a level 1 and a level 2 for a crash. The pressure sensor 30 can be connected to a detection hose in the form of the hose 42, which protrudes into the cavity 24. Data evaluation and reporting of a possible fault in the high-voltage battery 14 can take place when values exceed or fall below the corresponding limit values, that is to say the limit change value and/or the alarm limit change value. Corresponding vehicle electronics, that is to say the evaluation device 32, then send a message to the display device 40 in the form of a vehicle display, on the basis of which a visit to the workshop is suggested, for example.

The invention claimed is:

1. A warning system comprising,
   a battery housing;
   an underride protection device;
   a spatially closed cavity;
   a pressure sensor configured to measure a pressure difference in the spatially closed cavity between the underride protection device and the battery housing, wherein the pressure sensor is arranged within the battery housing laterally to a battery; and
   an evaluation device, wherein the spatially closed cavity is arranged in a vertical direction of the warning system above the underride protection device and below the battery housing and is configured to change a volume of the spatially closed cavity upon a deformation of the underride protection device under the action of a predetermined external force on the underride protection device, the pressure sensor is further configured to detect a pressure change value, which describes a pressure change of the pressure in the spatially closed cavity due to the change in the volume of the spatially closed cavity, and to provide the pressure change to the evaluation device, and the evaluation device is configured to provide a warning signal after the detected pressure change value is greater than a predetermined limit change value.

2. The warning system according to claim 1, wherein the pressure sensor is arranged in the spatially closed cavity.

3. The warning system according to claim 1, further comprising:
   at least one hose having a first hose end and a second hose end, wherein the first hose end is coupled to the sensor and the second hose end is positioned open in the spatially closed cavity.

4. The warning system according to claim 1, wherein the pressure sensor is arranged
   in the underride protection device.

5. The warning system according to claim 1, further comprising:
   a display device configured to display the warning signal provided as a predetermined warning message.

6. The warning system according to claim 2, wherein the warning system further comprises:
   at least one hose having a first hose end and a second hose end, wherein the first hose end is coupled to the pressure sensor and the second hose end is positioned open in the cavity.

7. The warning system according to claim 2, further comprising:
   a display device configured to display the warning signal provided as a predetermined warning message.

8. The warning system according to claim 3, further comprising:
   a display device configured to display the warning signal provided as a predetermined warning message.

9. The warning system according to claim 4, further comprising:
   a display device which is configured to display the warning signal provided as a predetermined warning message.

10. The warning system according to claim 1, wherein the pressure sensor is arranged within the battery housing within at least one separating element of the battery housing and the at least one separating element spatially separates at least two high-voltage battery modules of a battery from one another.

11. The warning system according to claim 1, wherein the pressure sensor is arranged above a screw head of at least one connecting screw of the warning system, the battery housing is coupled to the underride protection device by means of the at least one connecting screw, and the at least one connecting screw is coupled by means of the screw head to an upper side of the at least one separating element of the battery housing.

12. A motor vehicle having the warning system as claimed in claim 1.

* * * * *